Patented Apr. 8, 1952

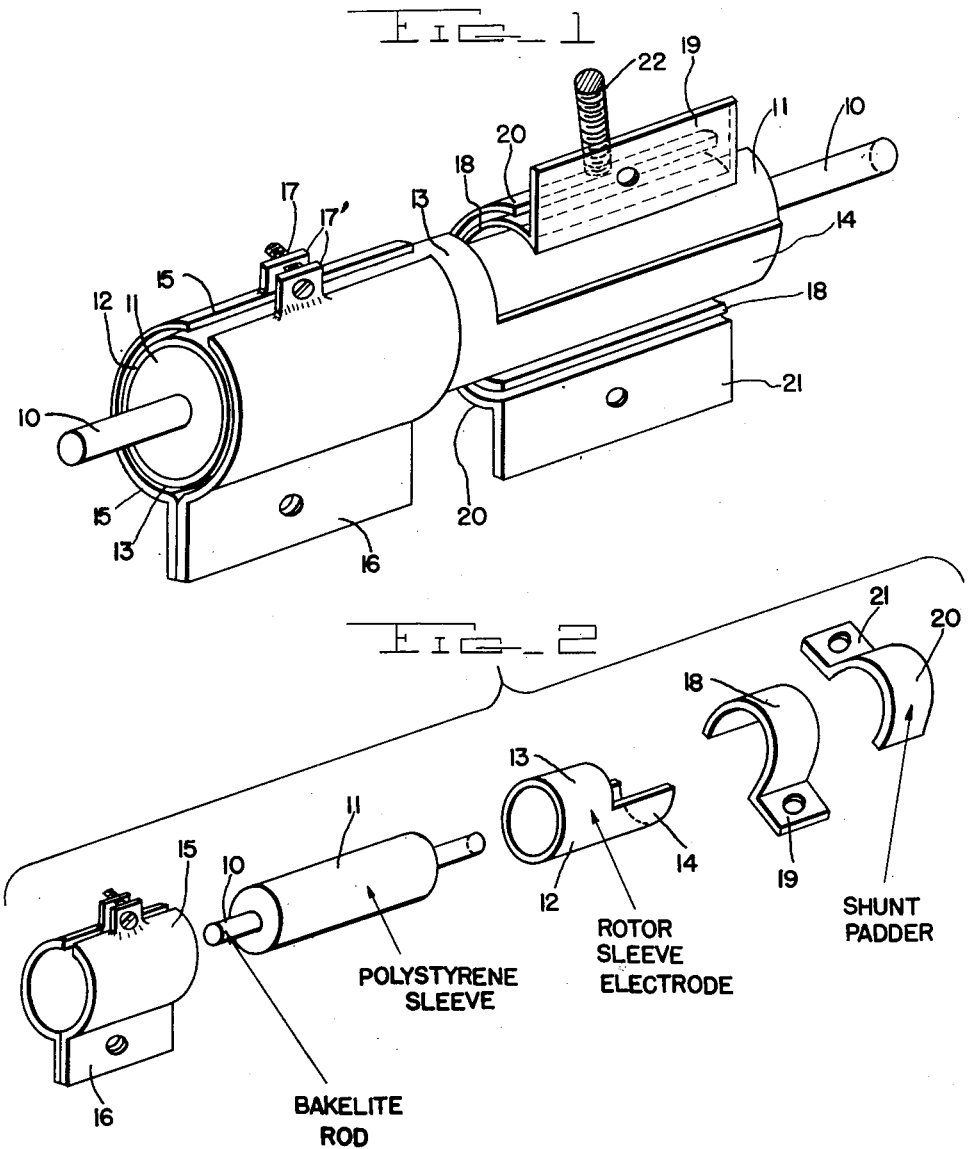

2,591,717

UNITED STATES PATENT OFFICE 2,591,717

VARIABLE CAPACITOR

Irving H. Page, Washington, D. C.

Application September 19, 1945, Serial No. 617,409

8 Claims. (Cl. 175—41.5)

(Granted under the act of March 3, 1883, as amended April 30, 1928; 370 O. G. 757)

This invention relates to variable capacitors for use in high-frequency radio circuits and, more particularly, to a rotary variable capacitor construction especially adapted for tuning resonant cavity coupling devices such as are widely used in radio receiving circuits operating at ultra-high radio frequencies.

An object of the invention is to provide an improved rotary variable capacitor construction which is simple and compact and, in addition, is easy to assemble and mount within a resonant chamber.

Another object of the invention is to provide variable capacitor construction for ultra-high-frequency radio circuits which is capable of being ganged in groups for operation by a common control means as required by the mechanical layout of the various cavity resonator circuits.

Other objects and their advantages will appear from a reading of the following specification, which is accompanied by drawings, wherein:

Fig. 1 is a perspective view illustrating an embodiment of the invention; and

Fig. 2 is an exploded view of the parts comprising the capacitor shown in Fig. 1.

Referring more in detail to the drawings, the variable capacitor of the present invention comprises the insulating rod 10 which may be of Bakelite or other strong hard insulating material of high dielectric strength serving as a rotatable shaft over which has been inserted and secured by a press-fit thereon the cylindrical sleeve 11 formed of a low-loss dielectric material, such as polystyrene. The rotor electrode of this variable capacitor comprises the conductive sleeve 12 formed preferably of brass tubing of substantially the same length as the dielectric sleeve 11 and having a first axially disposed portion 13 in the form of a complete hollow cylinder and a second axially disposed portion 14 in the form of a partial or incomplete cylinder which, in the present instance, is shown as a half cylinder. The stator electrode comprises a diametrically adjustable cylindrical member of conductive material shown in the form of a sheet metal split-cylinder or collar 15 which surrounds the complete hollow cylinder portion 13 of the rotor element. The encircling cylinder 15 is shown split longitudinally at a side enabling it to be spread and contracted and has an interior cylindrical surface in an engirdling relationship about and separated from the cylindrical sleeve portion 13 by air dielectric. The collar 15 is mechanically supported by the conductive strip member or tab 16 which enables the stator member to be connected to any electrical circuit to be tuned.

The cylindrical stator 15 may be formed either of a single piece of beryllium-copper sheet stock bent into cylindrical form with the tab 16 secured thereto by silver solder, or it may have the two-piece construction shown wherein the two complementary semi-cylindrical members are held in confronting relationship to complete the circular collar and suitably joined together as by means of a layer of silver solder placed between the respective tabs 16 of the two collar-forming halves. A screw 17 cooperating with lugs 17' on the collar is provided for adjusting the spacing or gap clearance and, in turn, the capacitance of the capacitor formed by the concentric cylindrical elements 13 and 15. By turning the screw 17 in one direction the split cylinder 15 is expanded thereby reducing the capacitance of the capacitor formed by the concentric cylinders. Reversing the direction of turning of the screw 17 will cause a contraction of the split cylinder 15 with a consequent increase in the capacitance of the capacitor.

A fixed half cylinder stator electrode 18 of beryllium-copper sheet stock is positioned over the incomplete cylindrical portion 14 of the rotor in such a manner as to form in conjunction with the semi-cylindrical portion 14 shown of the rotor electrode a capacitor having a capacitance which varies with angular rotational position of the portion 14 of the rotor electrode during its rotation within the angular extent of the stator electrode 18 by the shaft 10. It will be apparent that the two variable capacitor sections thus far described are effectively connected electrically together in series, the connection between them being the common rotor sleeve element 12. A mounting tab 19 serves to support the stator 18 in its intended operating position and also enables it to be connected to the proper point in a resonant circuit.

A second half cylinder stator electrode 20, also of beryllium-copper sheet stock, is positioned directly over the semi-cylindrical stator electrode 18 and in spaced relation thereto separated by air dielectric, thereby forming with it a fixed padding capacitor suitable for shunting the variable section described above. The stator electrode 20 is similarly supported by the mounting tab 21 which also serves as an electrical lead for connecting the fixed electrode 20 to a resonant circuit.

Suitable means such as screw 22 may be provided for adjusting the spacing between the half cylinder electrodes 18 and 20 forming the shunt padding or trimmer condenser to adjust its capacitance, as desired, for trimming or padding purposes, independent of the angular rotational adjustment of the rotor electrode 12 within the angular extent or confines of the semi-cylindrical stator electrodes.

Among the advantages of the variable capacitor of this invention over that of radial interleaving plate air dielectric condensers in wide use in the prior art are:

1. The elimination of all metallic rotary contact surfaces with the resultant absence of "contact noise" in the electrical circuits during tuning.

2. The cylindrical arrangement of the electrodes of the capacitors permits dimensioning of the parts whereby they may be rendered compact and the assembly easily insertible into resonant cavities or chambers having narrow or crowded space requirements.

While there is shown and described above a preferred embodiment of the invention, it is to be understood that various changes and modifications may be made therein without departing from the spirit of the invention and the scope of the appended claims.

The invention described herein may be manufactured and used by or for the Government of the United States of America for governmental purposes without the payment of any royalties thereon or therefor.

What is claimed is:

1. An electrical capacitor comprising a fixed electrode in the form of a hollow metallic cylindrical member, a cylindrical dielectric member rotatably arranged coaxially of said cylinder, a second electrode secured to said dielectric member for rotation therewith, said second electrode being in spaced relation with respect to said fixed electrode and separated therefrom by air dielectric, a portion of said second electrode being in the form of an incomplete hollow cylinder, a third and fixed electrode in the form of a partial cylinder spaced above said incomplete cylindrical portion of said second electrode in cooperating relationship thereto, and means for adjusting said first electrode to vary the spacing between said first and second electrodes.

2. An electrical capacitor comprising a fixed electrode in the form of a hollow metallic cylindrical member, a cylindrical dielectric member rotatably arranged coaxially of said cylinder, a second electrode secured to said dielectric member for rotation therewith, said second electrode being separated from said fixed electrode by air dielectric, a portion of said second electrode being in the form of an incomplete hollow cylinder, a third and fixed electrode in the form of a partial cylinder spaced above said incomplete cylindrical portion of said second electrode in cooperating relationship thereto, means for adjusting said first electrode to vary the spacing between said first and second electrodes, and means passing through said dielectric cylinder for carrying said second electrode and said dielectric cylinder and for adjusting the angular position of said second electrode with respect to said third electrode to vary the capacity between the incomplete cylindrical portion of said second electrode and said cooperating superposed third electrode.

3. A rotary variable capacitor especially adapted for high-frequency radio receiving circuits comprising a fixed electrode in the form of a hollow metallic cylindrical member, a cylindrical dielectric member rotatably arranged coaxially of said cylinder, a second electrode encircling and secured to said dielectric cylinder for rotation therewith, said second electrode being in spaced relationship with respect to said fixed electrode and separated therefrom by air dielectric, a portion of said second electrode being in the form of a complete hollow cylinder and the remainder of said electrode being in the form of an incomplete hollow cylinder, a plurality of electrodes in overlapped relationship each in the form of a partial cylinder spaced above said incomplete cylindrical portion of said second electrode, means connected to said first electrode to vary the spacing and the capacitance between said first and second electrodes, and means connected to said plurality of electrodes for varying the distance between the same to vary the capacitance therebetween.

4. A rotary variable capacitor for use in an ultra-high-frequency radio circuit comprising a rotatable shaft of electrical insulating material, a low-loss dielectric sleeve tightly fitted onto said shaft, a conductive sleeve rotor capacitor element tightly fitted onto said dielectric sleeve, said conductive sleeve having two portions one of which is a complete cylinder and the other a partial cylinder, a split cylinder stator capacitor element of conductive material concentric with and surrounding said complete cylinder portion of said rotor capacitor element, means for spreading and contracting said split cylindrical stator to vary the capacity between it and the cylindrical conductive sleeve portion of the rotor, a first half cylinder stator element above and concentric with said partial cylindrical portion of said rotor element, a second half cylinder stator element disposed over said first half cylinder stator element, and conductive support means integral with said stator elements for enabling operative electrical connection of the respective stator elements to an electrical circuit to be tuned.

5. A rotary variable capacitor for use in tuning an ultra-high-frequency radio circuit comprising a shaft of electrical insulating material, a sleeve tightly fitted onto said shaft and of a material having a low dielectric loss at the operating ultra-high frequencies to be used, a conductive sleeve forming the rotor capacitor element carried by said low loss dielectric sleeve, said rotor capacitor element consisting of two axial portions of different configuration, the first of said portions being a complete cylinder and the second portion being a half cylinder forming an axial extension of and integrally connected to the first portion, a split cylindrical stator capacitor element engirdling said cylindrical rotor portion, screw means operable for expanding or for contracting said split cylinder, a pair of semi-cylindrical stator elements disposed one above the other in spaced concentric relationship to each other and with respect to the half cylinder portion of said rotor capacitor portion, and conductive support means associated with said stator elements.

6. A rotary variable capacitor for tuning a resonant cavity comprising a rotatable insulating shaft, a dielectric support carried by said shaft and rotatable therewith, a conductive sleeve-like rotor electrode secured to said dielectric support, said rotor electrode having two portions, one of said portions being a complete cylinder and the other a partial cylinder, a conductive cylindrical stator electrode split longitudinally at one side enabling said stator to be spread and contracted, said stator element surrounding said cylindrical portion of said rotor electrode, means for contracting and spreading said split stator, a pair of semi-cylindrical conductive stator electrodes mounted above one another in overlapped relation, the inner stator electrode overlying said partial cylindrical portion of said rotor electrode, one of said pair of semi-cylindrical stator elements being adjustable with respect to the other for altering the range of capacity therebetween, the said inner stator electrode cooperating with the partial cylindrical portion of said rotor electrode to provide a variable capacity during rotation of the rotor electrode within the angular extent of said stator.

7. A rotary variable capacitor for tuning an ultra-high-frequency circuit comprising an insulating shaft, a low-loss dielectric sleeve fitted tightly upon said shaft, a conductive sleeve-like rotor electrode carried by and secured to said low-loss sleeve, said rotor electrode being in part cylindrical at one end portion and the remainder of its longitudinal extent being in the form of a partial cylinder, a fixed split cylinder stator electrode spaced from and engirdling said cylindrical portion of said rotor electrode, screw-means operative for expanding and contracting said split stator electrode, a pair of stator elements in the form of partial cylinders arranged one over the other, in superposed relationship above the partial cylinder portion of said rotor sleeve, and means for adjusting the upper of said partial cylindrical stator electrodes to vary the capacity between it and the other of said partially cylindrical stator elements for trimming purposes independent of the tuning adjustment of the rotor electrode.

8. A rotary variable capacitor comprising a rotor shaft of electrical insulating material, a dielectric sleeve secured on said insulating shaft, a rotor electrode in the form of a metallic sleeve insert tightly fitted over and secured to said dielectric sleeve and having a complete cylindrical portion and an incomplete cylindrical portion, and a set of stator electrodes comprising cylindrically curved metallic plate members disposed in axially spaced positions with respect to said metallic rotor sleeve, one of said stator electrodes being of split cylindrical shape spaced around the cylindrical portion of said rotor and the other stator being of partial cylindrical curvature spaced from and cooperating with said incomplete cylindrical portion of said rotor for providing a variable capacity upon rotation of said rotor electrode.

IRVING H. PAGE.

REFERENCES CITED

The following references are of record in the file of this patent:

UNITED STATES PATENTS

| Number | Name | Date |
|---|---|---|
| 1,573,374 | Chamberlain | Feb. 16, 1926 |
| 1,749,967 | Benjamin | Mar. 11, 1930 |
| 1,755,115 | Hazeltine | Apr. 15, 1930 |
| 2,008,289 | Mathieu | July 16, 1935 |
| 2,123,050 | Johnson | July 5, 1938 |
| 2,253,978 | Meriwether | Aug. 26, 1941 |
| 2,299,271 | Godsey | Oct. 20, 1942 |

FOREIGN PATENTS

| Number | Country | Date |
|---|---|---|
| 541,712 | Great Britain | Dec. 8, 1941 |